(12) United States Patent
Chlopek

(10) Patent No.: US 10,450,464 B2
(45) Date of Patent: Oct. 22, 2019

(54) MIXTURES OF COATED PIGMENTS AND FATTY ACID SALTS FOR DYEING PVC

(71) Applicant: LANXESS DEUTSCHLAND GMBH, Cologne (DE)

(72) Inventor: Krzysztof Chlopek, Krefeld (DE)

(73) Assignee: LANXESS Deutschland GmbH, Cologne (DE)

( * ) Notice: Subject to any disclaimer, the term of this patent is extended or adjusted under 35 U.S.C. 154(b) by 201 days.

(21) Appl. No.: 15/319,448

(22) PCT Filed: Jun. 17, 2015

(86) PCT No.: PCT/EP2015/063632
§ 371 (c)(1),
(2) Date: Dec. 16, 2016

(87) PCT Pub. No.: WO2015/193391
PCT Pub. Date: Dec. 23, 2015

(65) Prior Publication Data
US 2017/0145218 A1 May 25, 2017

(30) Foreign Application Priority Data
Jun. 18, 2014 (EP) .................................... 14173007

(51) Int. Cl.
| | | |
|---|---|---|
| C09C 1/00 | (2006.01) |
| C08L 27/06 | (2006.01) |
| C08K 9/02 | (2006.01) |
| C08K 3/013 | (2018.01) |
| C09C 3/06 | (2006.01) |
| C09C 3/08 | (2006.01) |
| C08K 3/22 | (2006.01) |
| C09C 1/04 | (2006.01) |
| C09C 1/22 | (2006.01) |
| C09C 1/24 | (2006.01) |
| C08K 5/098 | (2006.01) |

(52) U.S. Cl.
CPC ............ C09C 1/0081 (2013.01); C08K 3/013 (2018.01); C08K 3/22 (2013.01); C08K 5/098 (2013.01); C08K 9/02 (2013.01); C08L 27/06 (2013.01); C09C 1/043 (2013.01); C09C 1/22 (2013.01); C09C 1/24 (2013.01); C09C 3/063 (2013.01); C09C 3/08 (2013.01); C01P 2006/19 (2013.01); C08K 2003/2272 (2013.01)

(58) Field of Classification Search
CPC ..................................................... C09C 1/0081
See application file for complete search history.

(56) References Cited

U.S. PATENT DOCUMENTS

| | | | |
|---|---|---|---|
| 4,710,375 A | 12/1987 | Takasuka et al. | |
| 4,734,136 A | 3/1988 | Burow | |
| 5,770,310 A * | 6/1998 | Noguchi .................. | A61K 8/19 |
| | | | 428/403 |
| 8,283,404 B2 | 10/2012 | Allen et al. | |
| 2006/0009546 A1 | 1/2006 | Brown | |
| 2013/0157187 A1 | 6/2013 | Zhou et al. | |
| 2015/0299430 A1 | 10/2015 | Chlopek et al. | |
| 2017/0137631 A1* | 5/2017 | Chlopek .................. | C08K 9/04 |

FOREIGN PATENT DOCUMENTS

| | | |
|---|---|---|
| JP | 53128633 A2 | 11/1978 |
| JP | 2002080669 A2 | 3/2002 |
| JP | 2004263101 A2 | 9/2004 |
| WO | 10022936 A2 | 3/2010 |

OTHER PUBLICATIONS

Lee, Subhash S., "Pigments for PVC Applications", Journal of Vinyl Technology, Jun. 1984, vol. 6. No. 2, pp. 77-81.
Carty, P. et al., "A review of the role of iron containing compounds in char forming/smoke suppressing reactions during the thermal decomposition of semi-rigid poly(vinyl chloride) formulations", Polymer, vol. 33, Issue 13, 1992, pp. 2704-2708, abstract.
European Search Report from corresponding European Application No. 14173007, dated Sep. 8, 2014, two pages.

* cited by examiner

*Primary Examiner* — Vickey Nerangis

(57) ABSTRACT

The present invention relates to mixtures of pigments comprising at least one inorganic compound selected from the group of iron oxides, iron oxide hydrates, zinc ferrites, zinc oxides, magnesium ferrites and manganese ferrites, wherein the at least one inorganic compound is equipped with a coating comprising at least one hydroxide or oxide of magnesium or calcium and at least one calcium salt or magnesium salt of a fatty acid, to processes for production thereof, to the use thereof for coloring polyvinyl chloride (PVC) and to processes for coloring PVC and to PVC colored with such mixtures, and also to plastics products comprising such mixtures.

19 Claims, No Drawings

MIXTURES OF COATED PIGMENTS AND FATTY ACID SALTS FOR DYEING PVC

The present invention relates to mixtures of pigments comprising at least one inorganic compound selected from the group of iron oxides, iron oxide hydroxides, zinc ferrites, zinc oxides, magnesium ferrites and manganese ferrites, wherein the at feast one inorganic compound is equipped with a coating comprising at least one hydroxide or oxide of magnesium or calcium and at least one calcium salt or magnesium salt of a fatty acid, to processes for production thereof, to the use thereof for coloring polyvinyl chloride (PVC) and to processes for coloring PVC and to PVC colored with such mixtures, and also to plastics products comprising such mixtures.

PVC is used predominantly as a raw material, for example, for window profiles, pipes, floor coverings and roofing membranes in the construction sector. Rigid and flexible films are likewise produced from PVC. PVC is often also used as insulation material for electrical cables, and for electrical switch boxes and feeding tubes for cables, cable ducts or cable covers.

PVC forms part of the group of the amorphous thermoplastic polymers. The plastic is typically hard and brittle and is customarily adapted for the different applications by the addition of plastlcizers and stabilizers.

PVC is typically used with different contents of plasticizers. PVC having a content of plastlcizers of 0% to 12% is also called rigid PVC, PVC with a content of plasticizers of more than 12% is also called flexible PVC (Römpp Chemielexikon [Römpp's Chemical Dictionary], Online Version 3.28, last update of the article: December 2009, document identifier: RD-16-03650). In general, plasticizer contents are reported in percent by weight.

PVC is frequently colored with organic and inorganic pigments. Organic pigments used are, for example, isoindoles, naphthol AS, copper phthalocyanine pigments or monoazo calcium salts. From the group of the inorganic pigments, mixed phase metal oxide pigments are frequently used, such as nickel rutile pigments, chromium rutile pigments, iron chromites, inverse cobalt or copper spinels or iron cobalt chromite spinels. These pigments are very weathering- and light-stable, but have the drawback of being many times more expensive than other iron-containing inorganic pigments.

Also known is the coloring of PVC with inorganic pigments such as iron oxides or iron oxide hydroxides, zinc ferrites, magnesium ferrites or manganese ferrites. Iron oxides and iron oxide hydroxides are found to be particularly light-fast pigments having a constant color over a long period even under a wide variety of different weathering conditions. However, in the case of coloring of PVC with iron oxides or iron oxide hydroxides, zinc oxides, zinc ferrites, magnesium ferrites or manganese ferrites according to the prior art, homogeneous or inhomogeneous discoloration of the product occurs both in the course of processing at the high temperatures required and on exposure of the shaped plastic to light, UV light or heat. This undesirable phenomenon is much more serious in the case of rigid PVC, since products made from rigid PVC are frequently used outdoors, where weathering-related influences are of course more intense. In the case of products made from flexible PVC which are used predominantly indoors, such instances of discoloration also occur occasionally, for example shortly after processing. These adverse effects have already long been known and are described, for example, in S. S. Lele, J, Vinyl Tech. 1984, vol, 8, no. 2, p. 77 to 81 or P. Garty et al., Polymer 1992, vol. 33, no. 13, p. 2704-2708.

DE 3539308 A1 describes heat-resistant yellow pigments which have been coated with aluminium phosphate hydroxides of the general formula $[AlO]_xPO_4[OH]_{x-3}$ for coloring of thermoplastics. However, in-house experiments have shown that PVC colored with these coated pigments does not have sufficiently higher thermal stability than the PVC colored with the uncoated pigment. In-house experiments have also shown that PVC colored with other inorganic aluminum compounds, for example aluminum oxide or aluminum hydroxide or magnesium phosphate, likewise does not have higher thermal stability than PVC colored by uncoated iron oxides.

It was therefore an object of the present invention to provide products comprising at least one inorganic compound selected from the group of iron oxides, iron oxide hydroxides, zinc ferrites, zinc oxides, magnesium ferrites and manganese ferrites, which do not lead to unwanted homogeneous or inhomogeneous discoloration of the PVC colored therewith, either in the form of plastics products or of products produced therefrom.

It has now been found that, surprisingly, mixtures comprising at least one pigment comprising at least one inorganic compound selected from the group of iron oxides, iron oxide hydroxides, zinc ferrites, zinc oxides, magnesium ferrites and manganese ferrites, the at least one inorganic compound having been provided with a coating comprising at least one hydroxide or oxide of magnesium or calcium, and at least one calcium salt or magnesium sail of a fatty acid of the general formulae $C_nH_{2n+1}COOH$ (I), $C_nH_{2n-1}COOH$ (II), $C_nH_{2n-3}COOH$ (III) and/or $C_nH_{2n-5}COOH$ (IV), where n is from 10 to 20, preferably from 15 to 19, achieve this object and overcome the above-described disadvantages of the prior art pigments.

The mixtures of the invention are preferably in powder form.

Examples of iron oxides present in the pigments present in mixtures of the invention include hematite (iron oxide red, $\alpha$-$Fe_2O_3$), maghemite (brown iron oxide, $\gamma$-$F_2O_3$) or magnetite (iron oxide black, $Fe_3O_4$), preferably hematite (iron oxide red, $\alpha$-$Fe_2O_3$).

From the group of iron oxide hydroxides, the pigments present in the mixtures of the invention contain, for example, goethite (iron oxide yellow, $\alpha$-FeOOH) or tepidocrocite ($\gamma$-FeOOH).

Zinc ferrites, magnesium ferrites and/or manganese ferrites form part of the group of the mixed phase pigments of the general formula $M_xFe_{3-x}O_4$ where M is Zn, Mg or Mn, and x comprises values greater than 0 and less than or equal to 1. The pigment present in the mixtures of the invention may also comprise one or more different mixed phase pigments from those mentioned above.

Zinc oxide in the context of the invention is ZnO.

Preferably, the pigment present in the mixtures of the invention contains just one inorganic compound selected from the group of iron oxides, iron oxide hydroxides, zinc ferrites, zinc oxides, magnesium ferrites and manganese ferrites.

In the pigments present in the mixtures of the invention, the coating is preferably bonded directly to the at least one inorganic compound selected from the group of the iron oxides, iron oxide hydroxides, zinc ferrites, zinc oxides, magnesium ferrites and manganese ferrites. "Directly" in this connection means that there is no further interlayer present between the coating and the inorganic compound selected from the group of the iron oxides, iron oxide hydroxides, zinc ferrites, zinc oxides, magnesium ferrites and manganese ferrites. In this connection, "interlayer" means any other coating apart from the coating of the invention.

The fatty acids of the general formula $C_nH_{2n+1}COOH$ (I) are saturated fatty acids. Preferably, the calcium salts and/or magnesium salts of the saturated fatty acid are stearic add (n=17). The fatty acids of the general formulae $C_nH_{2n-1}COOH$ (II) are monounsaturated fatty acids, e.g. oleic acid (n=17). The fatty acids of the general formulae $C_nH_{2n-3}COOH$ (III) are diunsaturated fatty acids, e.g. linoleic acid (n=17). The fatty acids of the general formulae $C_nH_{2n-5}COOH$ (IV) are triunsaturated fatty acids, e.g. calendulic acid (n=17). Calcium stearate and/or magnesium stearate are particularly preferred.

In the context of the invention, "fatty acid salt" is used synonymously with "calcium salt or magnesium salt of a fatty acid of the general formulae (I), (II), (III) and/or (IV), where n is from 10 to 20, preferably from 15 to 19".

In one embodiment, the mixtures of the invention are in the form of a mixture of
at least one pigment comprising at least one inorganic compound selected from the group of iron oxides, iron oxide hydroxides, zinc ferrites, zinc oxides, magnesium ferrites and manganese ferrites, the at least one inorganic compound having been provided with a coating comprising at least one hydroxide or oxide of magnesium or calcium
with calcium stearate and/or magnesium stearate.

In a preferred embodiment, the pigments present in the mixtures of the invention contain preferably from 0.3% to 30% by weight, more preferably from 0.5% to 25% by weight, most preferably from 1% to 20% by weight, of magnesium and calcium, calculated as the sum of the contents of the elements magnesium and calcium, where the sum total of the contents of the elements magnesium and calcium is based on the total weight of the pigments.

In a further preferred embodiment, the mixtures of the invention contain preferably from 0.3% to 30% by weight, more preferably from 0.5% to 25% by weight, most preferably from 1% to 20% by weight, of magnesium and calcium, calculated as the sum of the contents of the elements magnesium and calcium, where the sum total of the contents of the elements magnesium and calcium is based on the total weight of the mixture.

The content of the elements magnesium and calcium in the pigment, unless stated otherwise, is determined via optical emission spectrometry after excitation in the inductively coupled plasma (ICP-OES). The content of the elements magnesium and calcium can also be determined by other quantitative test methods, for example by atomic absorption spectrometry (AAS).

In a further preferred embodiment, the mixtures of the invention simultaneously contain from 0.2% to 15% by weight of at least one fatty acid salt, preferably calcium stearate and/or magnesium stearate, where the percentages by weight are the ratio of the sum total of the weights of the fatty acid salts relative to the total weight of the mixture of the invention. The magnesium and calcium content of the mixture, unless stated otherwise, is determined via optical emission spectrometry after excitation in the inductively coupled plasma (ICP-OES).

The content of fatty acid salts, preferably of calcium stearate and/or magnesium stearate, in the mixtures of the invention is determined, for example, via near infrared (NIB) and/or mid-IR spectroscopy (MIR). The measurement can be effected here directly on the sample. The presence of calcium stearate and/or magnesium stearate can be effected via suitable qualitative test methods, for example mass spectrometry or NMR spectroscopy. For this purpose, processing of the sample may be required, such that the at least one fatty acid salt present in the mixture, preferably calcium stearate and/or magnesium stearate, is separated from the pigment. This is effected, for example, by means of solvents and/or with ah alkaline liquid phase, for example sodium hydroxide solution. In the alkaline liquid phase, the fatty acid is present as a salt, for example as the sodium salt, in dissolved form and can be extracted into an organic phase as the free fatty acid after acidification. Such qualitative and quantitative test methods on fatty acid salts are known to those skilled in the art and, after calibration tests required beforehand, afford reproducible results independent of the test method. The at least one fatty acid salt, preferably calcium stearate and/or magnesium stearate, can also be detected via gas chromatography/mass spectrometry coupling (GC-MS coupling). For this purpose, the at least one fatty acid salt, preferably calcium stearate and/or magnesium stearate, present in the sample to be examined is reacted with an alcohol, for example butanol, to give the corresponding alkyl ester. This is then determined qualitatively and quantitatively via GC-MS coupling. Whether the at least one fatty acid salt, preferably calcium stearate and/or magnesium stearates is present as a further coating of the pigment or as a constituent of a mixture of the pigment can be determined unambiguously by electron micrographs of the sample to be examined. In the case of a further coating, the at least one fatty acid salt, preferably calcium stearate and/or magnesium stearate, can be detected on the surface of the pigment particles via scanning electron microscopy (SEM) together with energy-dispersive x-ray analysis (EDX). In the case of the mixture, the at least one fatty acid salt, preferably calcium stearate and/or magnesium stearate, is specifically not detected on the surface of the pigment particles, but as separate particles present between the pigment particles.

In a further preferred embodiment, the pigments present in the mixture of the invention are coated exclusively with hydroxides and/or oxides of magnesium. The uncoated pigments used typically contain traces of calcium salts. Therefore, the pigments coated with hydroxides and/or oxides of magnesium in this preferred embodiment typically comprise from 0.3% to 30% by weight, more preferably from 0.5% to 25% by weight and most preferably from 0.5% to 20% by weight of magnesium, and 0.001% to 0.1% by weight of calcium.

In a further preferred embodiment, the pigments present in the mixture of the invention consist of at least one inorganic compound selected from the group of iron oxides, iron oxide hydroxides, zinc ferrites, zinc oxides, magnesium ferrites and manganese ferrites, wherein the at least one inorganic compound is equipped with a coating comprising at least one hydroxide or oxide of magnesium or calcium, more preferably comprising at least one hydroxide of magnesium or calcium.

The mixtures of the invention typically have oil values between 20 and 40 g of oil/100 g of sample, preferably between 23 and 39 g of oil/100 g of sample.

The invention encompasses any conceivable combination of different process and physical parameters defined and the preferred ranges thereof.

If has now been found that, surprisingly, PVC colored with the mixtures of the invention has a higher thermal stability than PVC colored with the corresponding uncoated pigments. The elevated thermal stability of the PVC colored with the mixtures of the invention can be shown by means of a thermal treatment with a kneader when the plot of the torque on the kneader against time and the temperature of the kneaded product is recorded and compared for various samples. In the course of breakdown of the PVC, degradation of the polymer occurs, which leads to a decrease in the viscosity and hence to a reduction in the torque on the kneader.

In addition, the elevated thermal stability of the PVC colored with the mixture of the invention can be measured by the testing of specimens in a Mathis oven. This test method is described in PCT/EP2013/078585. The details of the test methods and the evaluation thereof can be found in the "Examples and Methods" section.

The present invention also relates to the use of the mixtures of the invention for coloring PVC, preferably rigid PVC.

The present invention also relates to a method of coloring PVC, preferably rigid PVC, with the mixture of the invention. The coloring can be effected by customary methods, for example by mixing, kneading or extruding uncolored PVC with the mixture of the invention in the melt or by melting PVC dryblends comprising the mixtures of the invention.

The present invention also relates to plastics products, for which the terms masterbatch, compounds or colored end product are used synonymously, comprising at feast one mixture of the invention, and additionally comprising at least one polymer.

The at least one polymer is preferably at least 50% by weight, preferably at least 80% by weight, formed from the monomer vinyl chloride. This is the case firstly if the polymer is a PVC copolymer formed not only from vinyl chloride but also from other monomers, for example vinyl acetate or butyl acrylate. In that case, the copolymer has preferably been formed at least to an extent of 50% by weight, more preferably at least to an extent of 80% by weight, from the monomer vinyl chloride. This is the case secondly if the polymer comprises mixtures or blends of various polymers, one of the polymers being a PVC homopolymer or a PVC copolymer. In that case, the mixture or blend has preferably been formed at least to an extent of 50% by weight, more preferably at least to an extent of 80% by weight, from the monomer vinyl chloride. The polymer is preferably PVC, more preferably rigid PVC. Colored PVC in the context of the invention is understood to mean a PVC in which the mixture of the invention has been incorporated into the polymer matrix of the polyvinyl chloride.

Compounds further comprise, for example, processing aids, reinforces, fillers, dyes, further pigments and other organic and inorganic additives, and thus enable the production of a wide variety of different moldings, for example through extrusion, injection molding, calendering or blow-molding. The moldings generally correspond to the end products, called products in the context of this invention, for example window frames, pipes, insulation material, films or bottles. The PVC is colored by adding masterbatches or adding the pigment directly to the compounds. The plastics product of the invention comprises, according to the end use, different amounts of mixture of the invention.

Plastics products from the group of the masterbatches are typically used in the form of "color concentrates" for coloring of PVC or other plastics products. Therefore, these plastics products have a relatively high content of 10% to 90% by weight, more preferably of 20% to 70% by weight, of mixture of the invention and a polymer content of 10% to 90% by weight, preferably of 30% to 80% by weight, based in each case on the total weight of the plastics product. In a further embodiment, the masterbatches comprise, as polymer, waxes, optionally in a mixture with PVC, or else without mixing with PVG. Waxes selected are, for example, polyethylene waxes, Fischer-Tropsch waxes, mineral waxes, montan waxes, vegetable waxes and/or animal waxes. The aforementioned components preferably add up to 40% to 100% by weight, more preferably to 70% to 100% by weight, based on the total weight of the plastics product.

If the plastics product is already in its for ultimate use as compound with the desired color, these plastics products, in a preferred embodiment, have a content of 0.1% to 10% by weight, more preferably 0.5% to 5% by weight, of mixture of the invention and a polymer content preferably of 90% to 99.9% by weight, more preferably 95% to 99.5% by weight, based in each case on the total weight of the plastics product.

The present invention also relates to a process for producing the plastics products of the invention, especially compounds and masterbatches, by kneading and extruding polymer with the mixture of the invention.

PVC is used in accordance with the invention with different contents of plasticizers. PVC having a content of plasticizers of 0% to 12% is also called rigid PVC. PVC with a content of plasticizers of more than 12% is also called flexible PVC (Römpp Chemielexikon, Online Version 3.28, last update of the article: December 2009, document identifier: RD-18-03850).

The invention also relates to a plastics product comprising from 0% to 15% by weight, preferably from 0% to 12% by weight, of plasticizer, based on the amount of polymer present in the plastics product.

Suitable plasticizers are, for example, primary and secondary plasticizers and extenders. Primary plasticizers are, for example, phthalic esters, trimellitic esters, phosphates and polymer plasticizers. Secondary plasticizers are, for example, adipates, azelates, decanedioic esters and alkyl fatty acid esters. The group of the extenders includes, for example, aromatic hydrocarbons and chloroparaffins (from Römpp Chemielexikon, Online Version 3.2.8, article last updated: March 2008, document identifier: RD-23-00480).

The present invention also relates to a plastics product, for which the term "PVC dryblend" is also used, comprising a mixture of pulverulent polymer, preferably PVC, more preferably rigid PVC, and mixture of the invention. PVC dryblends of this kind may additionally also comprise the additives required for the production of compounds (e.g. fillers, stabilizers, optionally further plasticizers, dyes, optionally further pigments). These may be present either in substance alongside the PVC or may already have been incorporated into the PVC of the dryblend. Dryblends are typically produced by intensive mixing of the above-described constituents thereof 0.5 and 5 K below the melting point of the plastic. The dryblends can be used to produce the products by the processing methods customary for PVC, such as extrusion, injection molding, calendering or blow-molding.

The present invention also relates to a product, for which the terms "molding" or "finished good" are also used synonymously in the context of this invention, comprising at least one plastics product according to the invention. Products of this kind are, for example, window profiles, pipes, floor coverings, insulation material or roofing membranes.

The present invention also relates to a process for producing the pigments present in the mixture of the invention.

Coating can be accomplished by any processes which lead to coating of the compounds mentioned onto pigments. These include application by grinding, precipitation or spraying of the compounds with which the pigment is to be coated, either in solid form or in suspension form or in solution form.

The preferred process of the invention for producing the pigment present in the mixture of the invention comprises at least the steps of
- a) providing an aqueous suspension of at least one inorganic compound selected from the group of iron oxides, iron oxide hydroxides, zinc ferrites, zinc oxides, magnesium ferrites and manganese ferrites, and
- b) precipitating the coating of at least one hydroxide or oxide of magnesium or calcium onto the inorganic compound by adding magnesium salts and/or calcium salts, preferably in dissolved form, to the suspension from step a) and then adding a precipitant selected from the group of alkali metal hydroxides, alkaline earth metal hydroxides and ammonia, preferably in dissolved form, to the suspension or
- b') precipitating the coating of at least one hydroxide or oxide of magnesium or calcium onto the inorganic compound by adding a precipitant selected from the group of alkali metal hydroxides, alkaline earth metal hydroxides and ammonia, preferably in dissolved form, to the suspension from step a) and then adding magnesium salts and/or calcium salts, preferably in dissolved form, to the suspension, to obtain the pigment in suspension.

The preferred process for producing the coated pigment present in the mixture of the invention optionally additionally comprises one, two, three or four of the steps of
- c) isolating the pigment,
- c') washing the pigment,
- c'') drying the pigment, and
- c''') comminuting the pigment.

More preferably, the process for producing the pigment present in the mixture of the invention comprises, in addition to steps a), b) or b') or b''), the steps of c) separating the pigment from the liquid phase, c') washing the pigment, c'') drying the pigment, and c''') comminuting the pigment, in the sequence specified.

The mixture of the invention is produced in step d) by mixing the pigment obtained, preferably the pigment obtained from step c'''), with at least one fatty acid salt, preferably with magnesium stearate and/or calcium stearate.

The inorganic compounds used in step a) of the preferred process are pulverulent pigments or pastes made from pigments which originate directly from the pigment production operation. Pastes are pigment-containing aqueous suspensions.

In a further variant (step b''), the addition of the precipitant selected from the group of alkali metal hydroxides, alkaline earth metal hydroxides and ammonia, preferably in dissolved form, and of the magnesium and/or calcium salts, preferably in dissolved form, to an initial charge of pigment suspension can also be effected simultaneously. The alternative steps b), b') or b'') result in coating of the inorganic compound with at least one hydroxide or oxide of magnesium or calcium.

The precipitants particularly preferred in the process according to the invention are sodium hydroxide and/or potassium hydroxide.

In the variants according to steps b), b') or b''), preference is given to using magnesium and/or calcium salts, more preferably aqueous solutions thereof, most preferably magnesium sulfate, magnesium chloride, magnesium nitrate, calcium chloride and/or calcium nitrate.

During the precipitative application of the coating composed of at least one hydroxide or oxide of magnesium or calcium to the inorganic compound and optionally during the further reaction, preferably a temperature of 10 to 99° C., more preferably of 20 to 85° C. and most preferably of 20 to 70° C. is chosen.

The time during which either the precipitant or the magnesium and/or calcium salts are added to the reaction mixture may vary within wide ranges.

Preference is given to mixing the reaction components in steps b), b') or b''), more preferably by means of static or dynamic mixers. For this purpose, for example, stirrers, propellers, paddles and/or pumps are used.

The reaction mixture from steps b), b') or b''), after the components have been added, is optionally mixed further. In order to allow the precipitative application of the at least one hydroxide or oxide of magnesium or calcium to the inorganic compound to proceed to a maximum degree. The time for the further reaction depends on the size of the reaction mixture. To check the completeness of the reaction, samples can be taken at time intervals, which are analyzed for the magnesium and/or calcium content. If the expected magnesium and/or calcium content is attained, the reaction is ended.

In one embodiment, after steps b) or b') or b''), the pigment is separated in step c) from the reaction mixture by standard methods, preferably by filtration or centrifugation.

The solids removed are then washed in step c') with water, preferably with demineralized water, preferably until the filtrate only has a conductivity of less than or equal to 2000 µS/m, more preferably of less than or equal to 1500 µS/m.

Subsequently, the pigment is dried in step c'') as a washed solid from step c'). The drying is typically conducted by means of belt driers, pan driers, spray driers or on metal sheets. Typically, the drying is effected at temperatures of 80 to 200° C., preferably of 80 to 200° C., place.

Subsequently, in step c'''), the dried solids are comminuted. Typically, the comminution in step c''') is effected in the form of grinding, for example by means of cross-beater mills, pendulum mills, jet mills or impact mills.

Subsequently, in step d), the pigment obtained from step c''') is mixed with at least one fatty acid salt, preferably with magnesium stearate and/or calcium stearate. Typically, the mixing is effected by means of apparatuses known to the person skilled in the art for solid mixtures. Preferably, the mixing is effected at ambient temperature, more preferably at 10 to 40° C.

The mixture of the invention is then in the form of a pulverulent product and can be used without further treatment steps for coloring of PVC.

In processes for producing pigments, calcination steps are used in some cases. Calcination is understood to mean a thermal treatment of a solid or semi-moist pigment at temperatures of greater than 600° C. This may be necessary when pigments are to be dewatered or converted to other polymorphs. In the process according to the invention, no calcination step is required. In a preferred embodiment of the process according to the invention, therefore, a calcination step is ruled out. In a particularly preferred embodiment of the process according to the invention, therefore, a calcination step at temperatures of greater than 600° C. is ruled out.

The particularly preferred process according to the invention thus comprises at least the steps of:

a) providing an aqueous suspension of at least one inorganic compound selected from the group of iron oxides, iron oxide hydroxides, zinc ferrites, line oxides, magnesium ferrites and manganese ferrites,
and
b) precipitating the coating of at least one hydroxide or oxide of magnesium or calcium onto the inorganic compound by adding magnesium salts and/or calcium salts, preferably in dissolved form, to the suspension from step a) and then adding a precipitant selected from the group of alkali metal hydroxides, alkaline earth metal hydroxides and ammonia, preferably in dissolved form, to the suspension, or
b') precipitating the coating of at least one hydroxide or oxide of magnesium or calcium onto the pigment by adding a precipitant from the group of alkali metal hydroxides, alkaline earth metal hydroxides, or ammonia, preferably in dissolved form, to the suspension from step a) and then adding magnesium salts and/or calcium salts, preferably in dissolved form, to the suspension, or
b") precipitating the coating of at least one hydroxide or oxide of magnesium or calcium onto the inorganic compound by the simultaneous addition of the precipitant selected from the group of alkali metal hydroxides, alkaline earth metal hydroxides and ammonia, preferably in dissolved form, and the magnesium salts and/or calcium salts, preferably in dissolved form, to the aqueous suspension from step a),
and
c) separating the pigment from the liquid phase, and
c') washing the pigment, and
c") drying the pigment, and
c'") comminuting the pigment,
and
d) mixing the pigment obtained from step c'") with at least one calcium salt or magnesium salt of a fatty acid of the general formulae (I), (II), (III) and/or (IV), preferably with magnesium stearate and/or calcium stearate.

The mixtures of the invention are an improvement over the prior art, since plastics products and products made from PVC which have been colored with the mixtures of the invention have a high thermal stability and UV stability.

EXAMPLES AND METHODS

I. Description of the Measurement and Test Methods Used

The results of the measurements for the examples are summarized in Table 1.
I.1 Mg and Ca Determination
The magnesium and calcium content of the pigments was measured via optical emission spectrometry after excitation in an inductively coupled plasma (ICP-OES: inductively coupled plasma-optical emission spectrometry) as the content of elements.
I.2 Oil Value
The oil value was determined according to standard DIN ISO 787/5 in g of oil/100 g of sample. "Sample" means either the pigment or the mixture.
I.3 Testing of PVC Stability by Means of Thermo Haake Rheomix 600p Kneader (Kneader Stability)
A pulverulent PVC mixture consisting of 50% by weight of Vestolit B 7021 Ultra+50% by weight of SorVyl DB 6888 Natur 3/03 is mixed homogeneously with the mixture to be tested (4% by weight based on 100% PVC composition).

A pulverulent PVC mixture consisting of 50% by weight of Vestolit B 7021 Ultra+50% by weight of SorVyl DB 8688 Natur 3/03 is mixed homogeneously with the pulverulent pigment sample to be tested (4% by weight based on 100% PVC composition) or the mixture to be tested.

The pigmented PVC mixture is introduced manually into the recording kneader (Thermo Haake Rheomix 600p with R6 roll rotors) which has been preheated to 190° C. and is equipped with a rotary rheometer. The recording program (PolyLab Monitor) is started and records the torque on the roll rotors and the temperature of the sample against time. The pigmented PVC mixture is kneaded at 190° C. and 50 rpm. In order to determine the suitability of the mixture with regard to the stabilization of PVC, the maximum torque on the time axis in minutes at which the highest product temperature was measured is reported. After this maximum torque, the torque declines significantly, since the PVC breaks down to an increasing degree after this time and the viscosity of the kneaded product decreases as a result. These values are compared with the corresponding value for the same, albeit uncoated, pigment powder. The longer the period of time until said maximum, the higher the stability of the PVC colored with the mixture.

II. Examples

II.1 Properties of the Inorganic Pigments and Plastics Used

Bayferrox® 110 pigment powder from LANXESS Deutschland GmbH: hematite (red iron oxide, α-Fe2O3) having a BET surface area to DIN ISO 9277 of 13-18 m$^2$/g.

Bayferrox® 920: goethite, α-FeOOH paste from LANXESS Deutschland GmbH, from which Bayferrox® 920 powder is produced by drying and grinding. The pulverulent pigment has a BET surface area to DIN ISO 9277 of 11-15 m$^2$/g. Alternatively, it is also possible to mix the pulverulent Bayferrox® 920 pigment with water to give a slurry having the appropriate pigment concentration (see examples).

Calcium stearate: Powder from VWR BDH PROLABO® with Ca content between 9% and 11% by weight (calculated as CaO).

SorVyl DB 668 Natur 3/03: Rigid PVC compound from Polymerchemie (powder form, stabilized with Ca/Zn, where the content of bis(pentane-2,4-dionato)calcium is less than 1% by weight, with softening point >120° C., flashpoint >190° C., ignition temperature >300° C., density to DIN EN ISO 1183-1 method A, of 1.39 g/cm$^3$, bulk density to DIN EN ISO 60 of 0.54 g/ml, thermal stability to DIN EN 60811-3-2 of greater than/equal to 25 min.).

VESTOLIT® B 7021 Ultra: Mikro-S-PVC homopolymer from Vestolit (powder form, K value to DIN EN ISO 1628-2 of 70, viscosity number to DIN EN ISO 1628-2 of 125 cm$^3$/g, bulk density to DIN EN ISO 60 of 0.3 g/cm$^3$, sieve analysis—residue on 0.063 mm sieve to DIN EN ISO 1624 of <1%, water content according to K. Fischer DIN 53 715 of ≤0.3%, pH of the aqueous extract to DIN EN ISO 1284 of 8, 1.5/s paste viscosity of 1.8 Pa s 45/s paste viscosity of 2.2 Pa s).

II.2 Inventive Examples and Comparative Examples

Example 1 (Comparative Example)

145.6 g of Bayferrox® 110 pigment and 4.5 g of calcium stearate were added to the Henschel FM4 mixer (from Thyssen Henschel). The two substances were mixed together at room temperature (20 to 25° C.) and 1000 rpm for 20 min. The pulverulent product is used for the testing without further treatment.

Example 2 (Comparative Example)

141 g of Bayferrox® 110 pigment and 9 g of calcium stearate were added to the Henschel FM4 mixer. The two substances were mixed together at room temperature (20 to 25° C.) and 1000 rpm for 20 min. The pulverulent product is used for the testing without further treatment.

Starting Material for Examples 3 and 4

To 3.3 dm$^3$ of aqueous suspension of Bayferrox® 110 (8.28 mol of Fe$_2$O$_3$ having a pH of 4.8 were added, at 60° C. while stirring, 1443 ml of an MgSO$_4$ solution (corresponding to 2.58 mol/dm$^3$ of MgO). Subsequently, 3.98 mol of NaOH per mole of Fe$_2$O$_3$ were added dropwise as a solution while stirring within 30 min. (2215 g with concentration 16.6 mol/dm$^3$). The suspension was stirred for a further 60 min. The pH of the suspension was >11. After the reaction had ended, the pigment was filtered through a suction filter, washed until the conductivity of the filtrate was below 300 µS/cm, dried to constant weight in a drying cabinet at 120° C. and ground in a Bauermeister mill (cross-beater mill with a sieve insert, mesh size 1 mm).

Example 3

145.5 g of pigment starting material 1 and 4.5 g of calcium stearate were added to the Henschel FM4 mixer. The two substances were mixed together at room temperature (20 to 25° C.) and 1000 rpm for 20 min. The pulverulent product is used for the testing without further treatment.

Example 4

141 g of pigment (starting material 1) and 9 g of calcium stearate ware added to the Henschel FM4 mixer. The two substances were mixed together at room temperature (20 to 25° C.) and 1000 rpm for 20 min. The pulverulent product is used for the testing without further treatment.

Example 5 (Comparative Example)

145.5 g of Bayferrox® 920 pigment powder and 4.5 g of calcium stearate were added to the Henschel FM4 mixer. The two substances were mixed together at room temperature (20 to 25° C.) and 1000 rpm for 20 min. The pulverulent product is used for the testing without further treatment.

Starting Material 2 for Examples 6 and 7

To 2.05 dm$^3$ of aqueous suspension of Bayferrox® 920 (5.83 mol of FeOOH) having a pH of 4 were added, at 60° C. while stirring, 3571 ml of an MgSO$_4$ solution (1.39 mol/dm$^3$ as MgO). Subsequently, 1.41 mol of NaOH per mole of FeOOH are added dropwise as a solution while stirring within 15 min. (1283 g with concentration 7.87 mol/dm$^3$). The suspension was stirred for a further 60 min. The pH of the suspension was about 10. After the reaction had ended, the pigment was filtered through a suction filter, washed until the conductivity of the filtrate was below 300 µS/cm, dried to constant weight in a drying cabinet at 120° C. and ground in a Bauermeister mill (cross-beater mill with a sieve insert, mesh size 1 mm).

Example 6 (Inventive)

145.5 g of pigment (starting material 2) and 4.5 g of calcium stearate were added to the Henschel FM4 mixer. The two substances were mixed together at room temperature (20 to 25° C.) and 1000 rpm for 20 min. The pulverulent product is used for the testing without further treatment.

Example 7 (Inventive)

141 g of pigment (starting material 2) and 9 g of calcium stearate were added to the Henschel FM4 mixer. The two substances were mixed together at room temperature (20 to 25° C.) and 1000 rpm for 20 min. The pulverulent product is used for the testing without further treatment.

The properties of the products are compiled in table 1.

TABLE 1

| Example | Mg content (% by wt.) | Calcium stearate content (% by wt.) | Oil value (g of oil/ 100 g of sample) | Kneader stability (min.) |
|---|---|---|---|---|
| Bayferrox® 110 [a] | 0.01 | 0 | 24.8 | 14 |
| 1 | 0.01 | 3 | 24.1 | 14 |
| 2 | 0.01 | 6 | 24.1 | 14 |
| 3 | 7.6 | 3 | 28.3 | 19 |
| 4 | 7.4 | 6 | 28.2 | 20 |
| Bayferrox® 920 [b] | 0.02 | 0 | 27.6 | 13 |
| 5 | 0.02 | 3 | 28.0 | 13 |
| 6 | 14.0 | 3 | 38.3 | 19 |
| 7 | 13.6 | 6 | 33.3 | 20 |

[a] uncoated pigment as direct comparison with examples 1 to 4,
[b] uncoated pigment as direct comparison with examples 5 to 7.

What is claimed is:

1. A mixture comprising:
   at least one coated pigment comprising at least one inorganic compound selected from the group consisting of iron oxides, iron oxide hydroxides, zinc ferrites, zinc oxides, magnesium ferrites and manganese ferrites, wherein the at least one inorganic compound comprises a coating comprising at least one hydroxide or oxide of magnesium and optionally at least one hydroxide or oxide of calcium, whereby the coated pigment comprises 0.3% to 30% by weight of magnesium, and may include traces of calcium to provide a calcium content of 0.1% by weight or less, and
   at least one calcium salt and/or magnesium salt of a fatty acid of the general formulae $C_nH_{2n+1}COOH$ (I), $C_nH_{2n-1}COOH$ (II), $C_nH_{2n-3}COOH$ (III) and/or $C_nH_{2n-5}COOH$ (IV), where n is 10 to 20.

2. The mixture as claimed in claim 1, wherein the coating does not include hydroxides or oxides of calcium.

3. The mixture as claimed in claim 1, wherein the coating is bonded directly to the at least one inorganic compound, and the coated pigment comprises 0.5 wt % to 30 wt % of magnesium and 0.001 wt % to 0.1 wt % of calcium.

4. The mixture as claimed in claim 1, wherein the mixture comprises a combined total of 0.3% to 30% by weight of magnesium and calcium, calculated as the sum total of the contents of the elements magnesium and calcium, where the sum total of the contents of the elements magnesium and calcium is based on the total weight of the mixture.

5. The mixture as claimed in claim 1, wherein the mixture comprises 0.2% to 15% by weight of the at the least one calcium salt and/or magnesium salt of a fatty acid.

6. The mixture as claimed in claim 1, wherein n is 15 to 19.

7. The mixture as claimed in claim 6, wherein:
the coating is bonded directly to the at least one inorganic compound;
the mixture comprises 0.3% to 30% by weight combined total of magnesium and calcium, calculated as the sum total of the contents of the elements magnesium and calcium, where the sum total of the contents of the elements magnesium and calcium is based on the total weight of the mixture; and
the mixture comprises 0.2% to 15% by weight of at the least one calcium salt and/or magnesium salt of a fatty acid.

8. The mixture as claimed in claim 7, wherein:
the coating comprises only the at least one hydroxide and/or oxide of magnesium and no oxides or hydroxides of calcium;
the coated pigment comprises 0.5 to 20 wt % magnesium and may contain 0.001 to 0.1 wt % calcium;
the mixture comprises 1% to 20% by weight combined total of magnesium and calcium, calculated as the sum total of the contents of the elements magnesium and calcium, where the sum total of the contents of the elements magnesium and calcium is based on the total weight of the mixture; and
the at least one calcium salt and/or magnesium salt comprises calcium stearate and/or magnesium stearate.

9. A process for producing the mixture as claimed in claim 1, the process comprising:
forming an aqueous suspension of the at least one inorganic compound;
precipitating the coating onto the inorganic compound by at least one of:
adding magnesium salts and optionally calcium salts to the suspension, and then adding a precipitant selected from the group consisting of alkali metal hydroxides, alkaline earth metal hydroxides and ammonia to the suspension to form coated pigment; or
adding a precipitant selected from the group consisting of alkali metal hydroxides, alkaline earth metal hydroxides and ammonia to the suspension, and then adding magnesium salts and optionally calcium salts to the suspension to form the coated pigment;
at least one of: isolating the coated pigment, washing the coated pigment, drying the coated pigment, and comminuting the coated pigment to provide a processed coated pigment; and
mixing the processed coated pigment with the at least one calcium salt and/or magnesium salt of a fatty acid at a temperature of 10 to 40° C. to form the mixture.

10. The process for producing the mixture as claimed in claim 9, wherein the process does not include a calcination step.

11. A plastics product comprising:
the mixture as claimed in claim 1, and
at least one polymer, where at least 50% by weight of the polymer is formed from monomers of vinyl chloride,
wherein the aforementioned components add up to 40% to 100% by weight, based on the total weight of the plastics product.

12. The plastics product as claimed in claim 11, wherein the plastics product comprises 10% to 90% by weight of the mixture.

13. The plastics product as claimed in claim 11, further comprising 0% to 15% by weight of plasticizer based on the amount of polymer present in the plastics product.

14. The plastics product as claimed in claim 11, wherein the polymer is pulverulent and the plastics product comprises a mixture of the pulverulent polymer and the mixture.

15. A product comprising at least one plastics product as claimed in claim 11.

16. The product as claimed in claim 15, wherein the product comprises window profiles, pipes, floor coverings, insulation material or roofing sheets.

17. A process for producing the plastics products as claimed in claim 11, the process comprising kneading or extruding the polymer with the mixture.

18. A process for producing the plastics product as claimed in claim 14, the process comprising mixing the mixture and pulverulent polyvinyl chloride, by mixing the constituents at a temperature of 0.5 to 20° K below the melting point of the polyvinyl chloride.

19. A method of coloring polyvinyl chloride, the method comprising mixing the mixture as claimed in claim 1 with polyvinyl chloride.

* * * * *